US008664546B2

(12) United States Patent
Schön

(10) Patent No.: US 8,664,546 B2
(45) Date of Patent: Mar. 4, 2014

(54) WEIGHING SCALE HAVING REGULATORY COMPLIANCE COMPONENTS

(75) Inventor: Thomas Schön, Balingen (DE)

(73) Assignee: Mettler-Toledo (Albstadt) GmbH, Albstadt (DE)

( * ) Notice: Subject to any disclaimer, the term of this patent is extended or adjusted under 35 U.S.C. 154(b) by 403 days.

(21) Appl. No.: 13/204,521

(22) Filed: Aug. 5, 2011

(65) Prior Publication Data

US 2012/0031683 A1   Feb. 9, 2012

(30) Foreign Application Priority Data

Aug. 5, 2010   (EP) ..................................... 10171987

(51) Int. Cl.
*G01G 21/28*   (2006.01)

(52) U.S. Cl.
USPC ............................. 177/124; 73/1.13; 174/562

(58) Field of Classification Search
USPC ..................... 177/124; 73/1.13; 174/562–564
See application file for complete search history.

(56) References Cited

U.S. PATENT DOCUMENTS

| 3,784,727 | A | * | 1/1974 | Haubein ........................ 174/562 |
| 4,799,559 | A | * | 1/1989 | Murdter et al. ................ 177/124 |
| 5,086,879 | A |   | 2/1992 | Latimer et al. |
| 5,481,071 | A | * | 1/1996 | Wojnarski ...................... 177/124 |

FOREIGN PATENT DOCUMENTS

| DE | 4445526 A1 | 8/1995 |
| DE | 19747323 A1 | 4/1999 |
| DE | 102006052486 A1 | 5/2008 |

* cited by examiner

*Primary Examiner* — Randy W Gibson
(74) *Attorney, Agent, or Firm* — Standley Law Group LLP

(57) ABSTRACT

An instrument having components that are relevant as well as components that are not relevant to regulatory compliance, and a housing serving to accommodate the components, wherein the components that are relevant to regulatory compliance are arranged in the housing under a verification cap, so that they can only be accessed by removing the verification cap, and wherein the verification cap is secured with a verification mark in such a way that removing the verification cap will cause the verification mark to be destroyed. In this arrangement, the verification cap is fastened with at least one locking element, the components that are relevant to regulatory compliance are accessible only after the locking element has been removed, and at least one locking element is designed so that it can be removed while the housing remains closed.

20 Claims, 4 Drawing Sheets

WEIGHING SCALE HAVING REGULATORY COMPLIANCE COMPONENTS

CROSS-REFERENCE TO RELATED APPLICATIONS

This application is entitled to the benefit of a right of priority under 35 USC 119 from European Patent Application No. 10171987.0, filed 5 Aug. 2010. The content of that application is incorporated by reference as fully recited herein.

TECHNICAL FIELD

Exemplary embodiments of the present invention relate to weighing scales. More particularly, exemplary embodiments of the present invention relates to weighing scales having regulatory components relevant to the official verification of the instrument for conformance to regulatory requirements.

BACKGROUND

The known state of the art offers methods to electronically protect data that is relevant to regulatory compliance. A weighing scale is disclosed in DE 4445526 C2 wherein the measurement transducer is tied to a switching element that is secured with a verification seal. In order to change data that is subject to verification of regulatory compliance, the switching element has to be flipped over. An electronic means of securing the verified status with password protection is disclosed in DE 19747323 C2.

To mechanically protect components that are relevant to regulatory compliance, the respective components are enclosed in a housing. An authorized individual, for example an employee of a government agency for Weights and Measures or another official representative, puts the instrument into condition to pass verification. The housing is subsequently closed up and receives a verification mark. The verification mark serves to document the verification and also to prevent an undetected or unauthorized access to components relevant to regulatory compliance.

State-of-the-art verification marks include for example verification seals, verification stamps, or wire seals. The verification mark is affixed to the closed housing in such a way that opening the housing causes the verification mark to be destroyed. An intact verification mark is therefore proof that the housing has not been opened.

In addition to the components that are relevant to the verification for regulatory compliance, the housing normally also contains components that are not relevant to regulatory compliance. Components without relevance to regulatory compliance can include for example electrical connectors, batteries, or similar components.

If an instrument meets the conditions for regulatory compliance, the housing of the instrument is closed up and protected against unauthorized access with a verification mark. The instrument thereby obtains the status of being "verified". If a component other than those that are relevant for verification needs to be accessed, the housing needs to be opened, whereby the verification mark will necessarily be destroyed. The destruction of the verification mark sets the instrument back to the status of "non-verified". In order to restore the status of "verified", an authorized person will have to examine the instrument, and the verification mark will have to be affixed again. This examination takes time and causes expenditures. To circumvent this problem, the components that are relevant for regulatory compliance are arranged under a verification cap inside the housing, so that the components that are subject to verification can only be accessed by removing the verification cap. Furthermore, the verification cap is secured by a verification mark. When the verification cap is removed, the verification mark will necessarily be damaged. An undamaged verification mark thus means proof that the verification cap has not been removed and that no changes could have been made in the components that are relevant to regulatory compliance verification. Accordingly, the instrument keeps the status of being verified.

In the instruments of the known state of the art, the verification marks are arranged in the interior of the housing. In an examination of the instrument by a Weights and Measures representative, the instrument needs to be opened. Often, a specially trained service technician is needed to open the instrument. Consequently, an examination of the verification status requires the presence of a Weights and Measures representative as well as a service technician, which involves a considerable expense and organizational effort. In the process of opening the instrument, the problem can occur that the housing and/or the seals that are arranged between the parts of the housing may get damaged.

SUMMARY OF THE INVENTIVE CONCEPT

Exemplary embodiments of the present invention have the objective to remove the disadvantages of the existing state of the art. The aim is, in particular, to create an instrument whose verification status can be ascertained in the simplest way possible. This task is solved with an instrument which comprises the features described in the specification and following claims.

The exemplary instruments according to the inventive concept comprise a housing which accommodates both the components that are relevant as well as those that are not relevant to regulatory compliance. The component layout is such that the components that are relevant to regulatory compliance are arranged under a verification cap, so that they can only be accessed by removing the verification cap. Furthermore, the verification cap is secured with a verification mark. In the process of removing the verification cap, the verification mark will necessarily be damaged. The verification mark can for example be a verification seal, a verification stamp, or a wire seal. An undamaged verification mark thus represents proof that the verification cap has not been removed and that no changes could have been made in the components that are relevant to compliance verification. The instrument therefore keeps its status of "verified". In addition, the verification cap is secured with at least one locking element, so that the components relevant to compliance verification, which are arranged underneath the verification cap, are accessible only after the locking element has been removed. At least one locking element is removable while the housing remains closed.

The locking element that is removable from the outside can be protected with a verification mark against undetected manipulation. Ideally, the verification mark is applied in such a way that it is visible while the housing is in its closed condition. Such a design has the advantage that the verification mark can be examined while the housing remains closed. This significantly simplifies the checking of the verification status by a Weights and Measures representative. In instruments of the existing state of the art, the verification marks are arranged in the interior of the housing. In an examination of the instrument by a Weights and Measures representative, the instrument has to be opened. In many cases, the instrument can only be opened by a specially trained service technician. An examination of the verification status therefore requires the presence of a Weights and Measures representative as well as a service technician, which entails a considerable coordinating effort and expenditures. In the process of opening the housing, the problem can occur that the housing and/or the seals arranged between the parts of the housing may suffer damage. This problem too, is obviated by the placement of the verification mark on the outside, as the housing does not need to be opened for the examination of the verification status.

The verification cap is secured with at least one locking element, and the components relevant to the verification which are arranged below the verification cap are accessible only after the latter has been removed. The locking element serves to make certain that the verification cap covering the compliance-relevant components remains secured. However, the locking element needs to be removable, in case that changes need to be made in the compliance-relevant components. The locking element can be any fastening element capable of being entirely or partially removed when necessary. By removing the locking element, the verified status of the instrument is cancelled. This has the advantage that the verified status of the instrument can be cancelled without requiring the housing to be opened.

The locking element can be a screw, and the verification cap can have a screw thread to receive the screw of the locking element. The locking element is secured in the thread. With the screw anchored in the thread, the verification cap is locked into place, covering the components that are relevant to regulatory verification. A verification mark is applied to the screw, whereby the latter is protected against unauthorized intrusion. Ideally, the locking element is arranged so that it also passes through the housing. The arrangement is such that the locking element can be released and/or removed only from the outside. Removing the locking element from the inside is not possible. This design offers the advantage that the verification mark can be applied to the locking element from the outside and the integrity of the verification mark can therefore be ascertained without requiring the housing to be opened.

In another exemplary embodiment, the components relevant to regulatory compliance are arranged on a carrier element, with the latter being arranged underneath the verification cap. The carrier element can for example be a printed circuit board.

Exemplary embodiments of the instrument can advantageously be equipped with a sensor serving to detect a position change of the locking element. In case the status of the instrument changes from "verified" to "non-verified", this can thus be registered by the sensor. If the locking element is a screw, the sensor is arranged so as to detect when the screw is turned out of its threaded hole. Sensors that can be used for this purpose include for example light sensors or pressure sensors. Light sensors can be arranged so that in the verified state a light gate is interrupted by the locking element. If the locking element is at least partially removed to cancel the verification, the light gate is closed and the instrument changes it status from "verified" to "non-verified". A pressure sensor can be arranged so that in the verified state the locking element pushes against the pressure sensor. In the non-verified state the locking element is at least partially removed, so that it no longer pushes against the pressure sensor. However, it is also possible to use other sensors and other arrangements.

The sensor issues a signal which provides information about the position change of the locking element. This signal can be transmitted to an output unit where it can be put to further use. An output unit can consist of an indicator unit of the instrument. The indicator unit is for example a monitor. The user can read on the monitor whether the instrument has the status of "verified" or "non-verified".

In some exemplary embodiment, the instrument is a weighing scale with a load receiver and a display- and operating unit. The components that are relevant to regulatory compliance are arranged in the housing of the display- and operating unit. The housing has a first housing part and a second housing part. The display unit is solidly connected to the first housing part, while the compliance-relevant components and the verification cap are connected to the second housing part. The locking element can be arranged so that it passes through the second housing part. This configuration has the advantage that the second housing part with the display- and operating unit can be removed from the first housing part without cancelling the "verified" status of the instrument.

There can be a seal arranged between the first and the second housing part. Opening the housing therefore entails the risk of damaging the seal. The ability to examine the verification mark without having to open the housing is therefore an advantageous feature.

For the instrument of the foregoing description, the status can be changed from "verified" to "non-verified" by at least partially removing the locking element. This offers the advantage that the "verified" status of the instrument can be cancelled in a simple manner.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
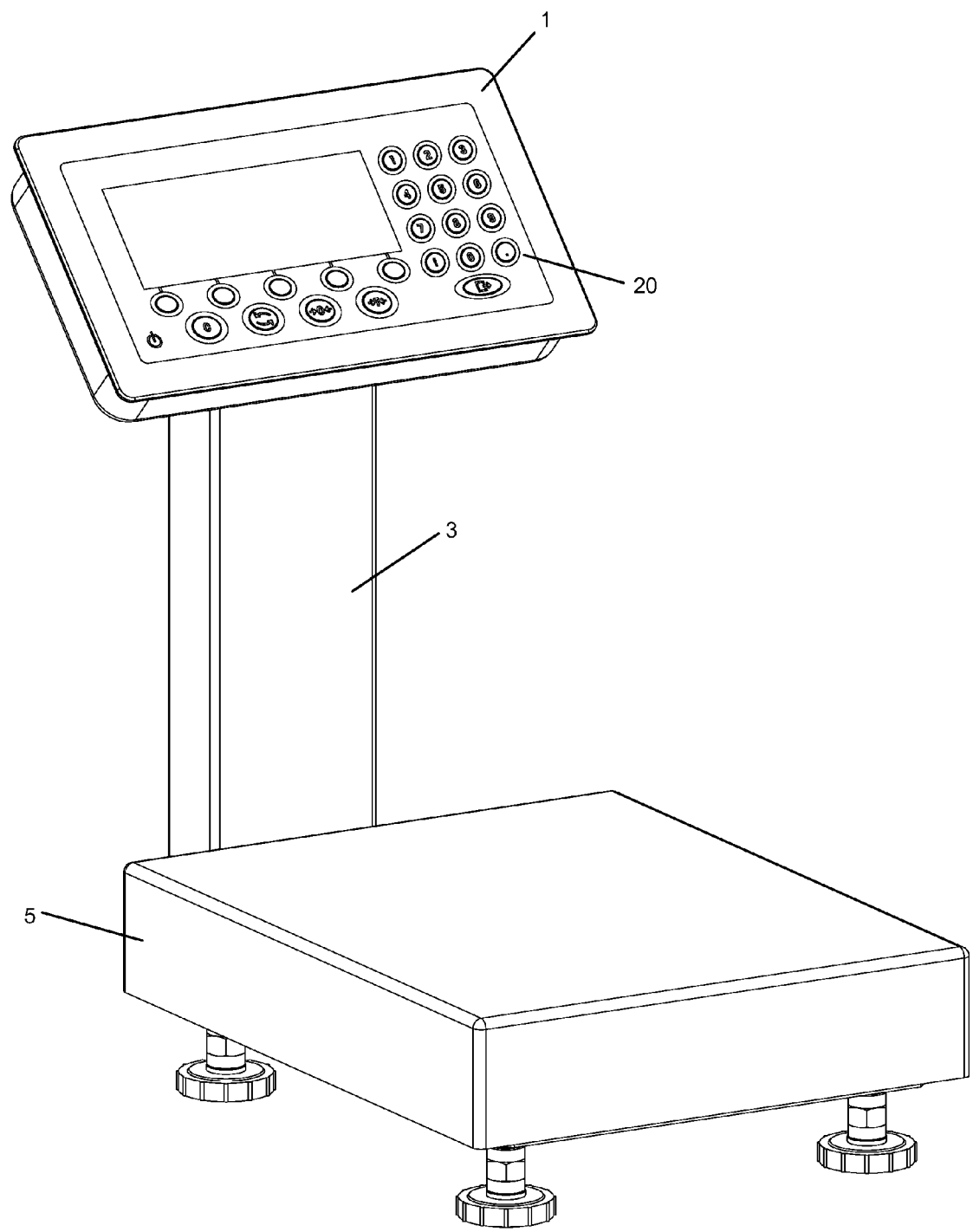
FIG. 1 is a perspective view illustrating an exemplary embodiment of the weighing scale.

FIG. 1 illustrates an exemplary instrument, in this case a scale with a weighing platform 5, a housing 1, a display- and operating unit 20, and a pedestal 3. The pedestal 3 has an upper and a lower end. Attached to the upper end of the pedestal 3 is the housing 1 on which the display- and operating unit 20 is arranged. The weighing platform 5 is arranged at the bottom end of the pedestal 3. For the determination of a weight, the weighing object is placed on the weighing platform 5. The display- and operating unit 20 displays the weight of the weighing object. Through the display- and operating unit 20, one can for example change settings that affect the operation of the scale.

Figure 2:
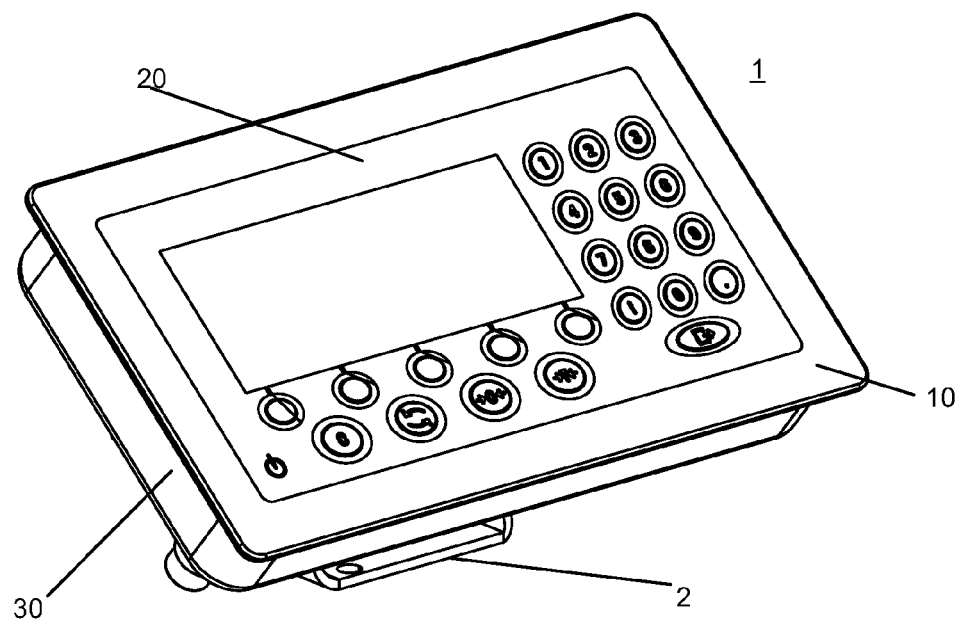
FIG. 2 is a perspective view illustrating a closed housing of an exemplary weighing scale.

FIG. 2 shows a perspective view of the housing 1 in the closed state. The housing 1 has a first housing part 10 and a second housing part 30. Arranged on the housing 1 is a connector element 2 for the connection of the housing 1 to the pedestal 3. The connector element 2 is pivoted, whereby the position of the housing 1 relative to the pedestal can be varied. The first housing part 10 has a plane outer surface in which the display- and indicator unit 20 is arranged. The second housing part 30 is configured in the shape of a tub. The first housing part 10 and the second housing part 30 enclose a space that serves to receive components that are relevant as well as components that are not relevant to regulatory compliance.

Figure 3:
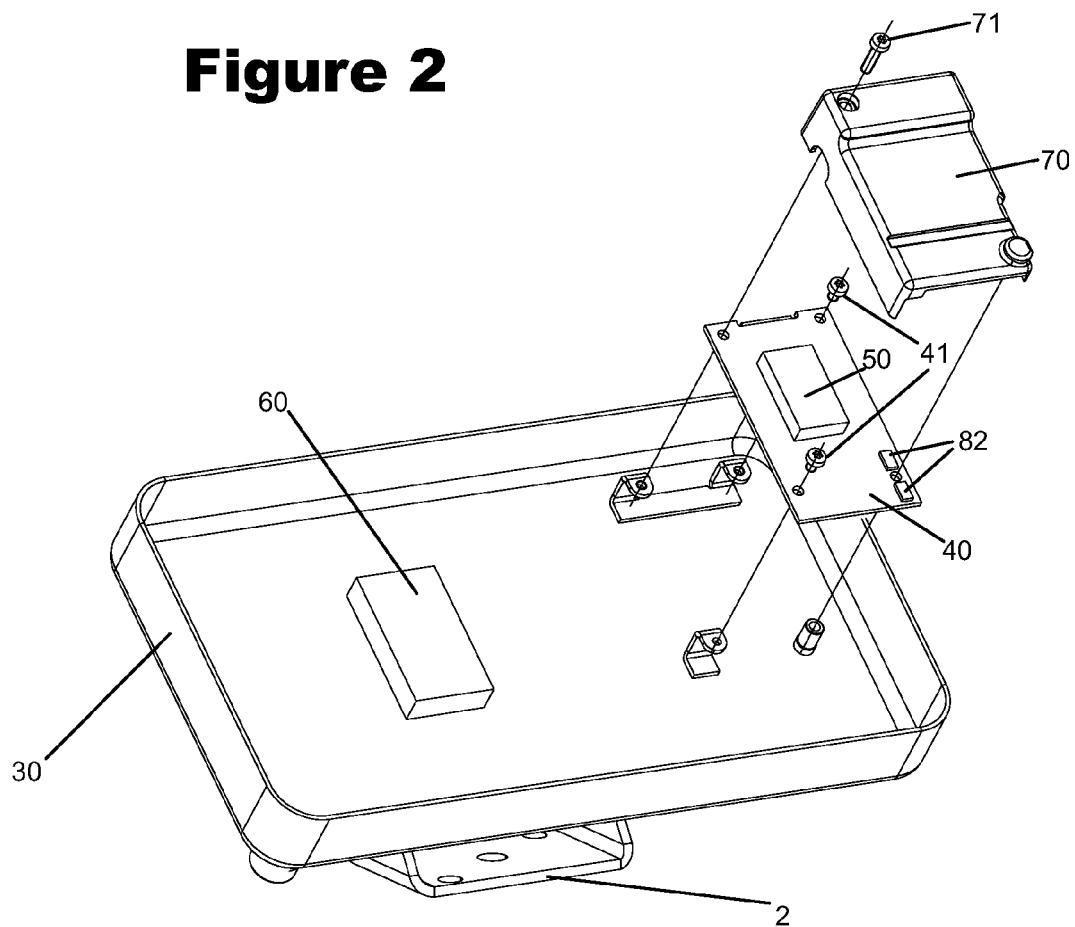
FIG. 3 is an exploded view illustrating an open housing of an exemplary weighing scale.

FIG. 3 is an exploded view of the housing 1 in the opened state and the components arranged inside it. Mounted in the tub-shaped second housing part 30 are components 60 that are not relevant as well as components 50 that are relevant to regulatory verification. When the housing 1 is open, the components 60 that are not relevant to regulatory verification can be changed without consequences for the components 50 that are relevant to regulatory verification. The latter components 50 are arranged on a carrier element 40. The carrier element 40 is fastened on the inside of the second housing part 30 by means of fastener elements 41. One could choose releasable fastener element such as for example screws. However, it is also conceivable to use non-releasable fastener elements such as for example rivets. A verification cap 70 is arranged as a cover over the carrier element 40 and the components 50 that are relevant to regulatory verification. Consequently, the components 50 that are relevant to regulatory verification are arranged between the second housing part 30 and the verification cap 70. If the verification cap 70 is not removed, the instrument keeps its verified status. The verification cap 70 is connected to the second housing part 30 with at least one fastener element 71. The verification cap 70 protects the components 50 that are relevant to regulatory verification against unauthorized access. Consequently the verification cap 70 has to be designed in such a way that the components 50 that are relevant to regulatory verification can only be changed after the verification cap 70 has been removed. After a change has been made by an authorized individual in the components 50 that are relevant to regulatory verification, the verification cap 70 has to be subsequently locked in place again over said components 50 in order to restore the verified status of the instrument 1. The release of the fastener element 71 therefore has to be reversible. As a practical choice, one or more screw connections are used. The fastener element 71 is accessible only when the housing 1 is open. It is also possible to use more than one fastener element 71. The fastener element 71 can be protected with a verification mark against unauthorized removal of the verification cap 70. However, it is of considerable advantage to arrange the verification mark in such a way that it remains visible also when the housing 1 is not opened.

Figure 4:
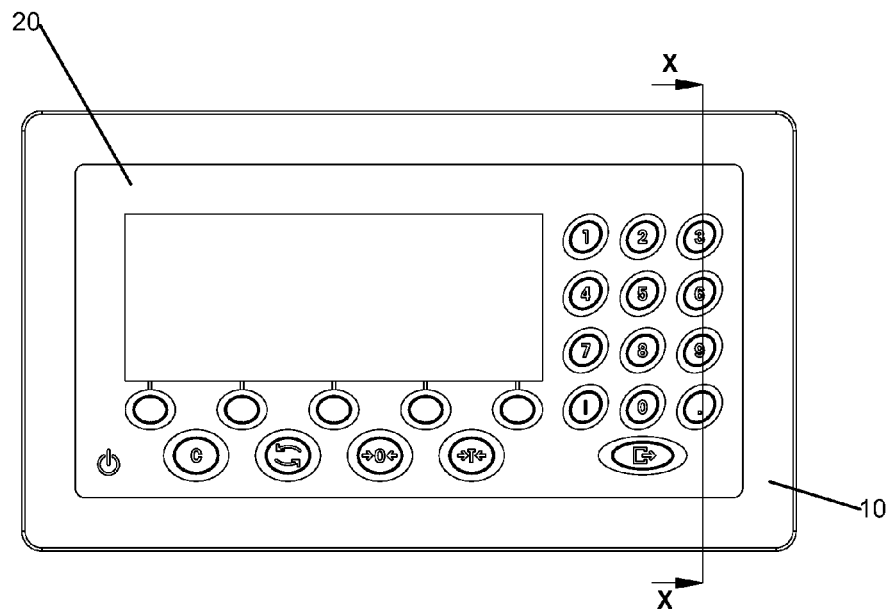
FIG. 4 is a top view of a housing of an exemplary weighing scale.
Figure 5:
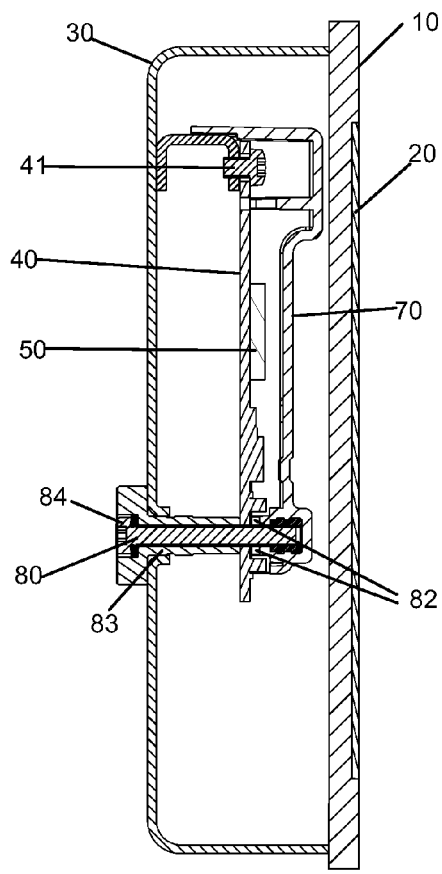
FIG. 5 is a cross-sectional view illustrating a closed housing of an exemplary weighing scale at line XX.
Figure 6:
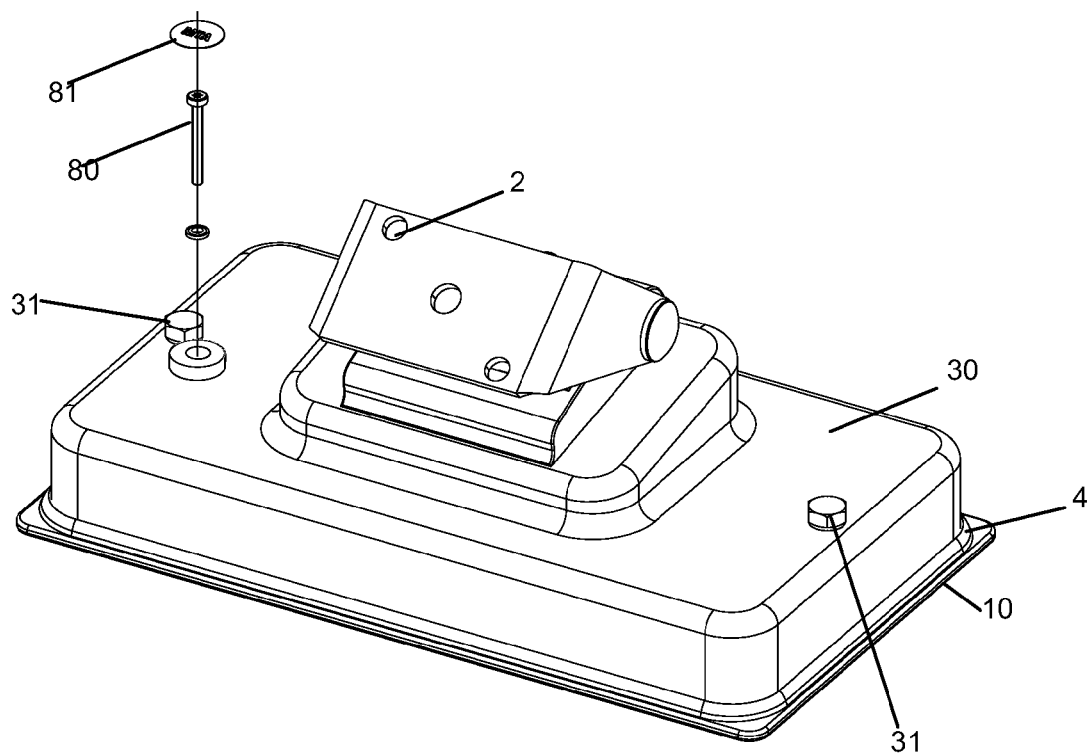
FIG. 6 is a bottom perspective view illustrating a closed housing of an exemplary weighing scale.

A possible solution is shown in FIG. 5, which represents a sectional view in the plane X-X of the housing 1 of FIG. 4. The locking element 80 passes through the tub-shaped second housing part 30 into the interior of the housing 1, where the locking element 80 secures the verification cap 70. In the illustrated embodiment, the locking element 80 is a screw, and the verification cap 70 has a thread to hold this screw. For additional assurance, the locking element 80 also passes through the carrier element 40 which holds the components 50 that are relevant to regulatory verification. The carrier element 40 and the components 50 that are relevant to regulatory verification are thereby further secured. This arrangement serves to prevent that the components 50 that are relevant to regulatory verification could be pulled out from under the verification cap 70. Ideal is a design which ensures that the locking element 80 can be moved only from outside the housing 1, but not from inside the housing 1. In the illustrated embodiment, the locking element 80 is therefore completely enclosed by a sleeve 83, the carrier element 40 and the verification cap 70. As shown in FIG. 6, the head of the screw 84 is protected by a verification mark 81. The locking element 80 can therefore only be changed after the verification mark 81 has first been destroyed. If the verification mark is intact, this establishes the fact that the components 50 that are relevant to regulatory verification have not been changed.

The position of the locking element 80 can be registered by sensors 82. The illustrated embodiment is equipped with optical sensors 82, but it is also possible to use other types of sensors.

As illustrated in FIGS. 3 and 5, the optical sensor 82 consists of two parts. One part is an emitter and the other part is a receiver. The emitter sends out a light signal. If the locking element 80 is in place between the emitter and the receiver, no light signal is picked up by the receiver. However, if the locking element 80 is unscrewed far enough to open the way for the light signal, the receiver will pick up the light signal from the emitter. The removal of the locking element 80, and thus the loss of the verified status of the instrument 1, can in this way be detected by the sensor 82. The sensor 82 can issue a verification signal providing information about the verification status of the instrument 1. This verification signal can for example be used for the purpose of indicating the verification status on the display- and operating unit 20.

While the invention has been described through the presentation of a specific example of an embodiment, it is considered obvious that there are numerous further variants that could be created based on the knowledge gained from the present invention.

The embodiments described above only represent preferred embodiments of the present invention. Various equivalent substitutions and modifications can be made by one skilled in the art based on the foregoing description. Nevertheless, all these substitutions and modifications fall within the spirit of the present invention and the scope as defined in the following claims:

What is claimed is:

1. An instrument comprising:
   a housing, said housing having an open and closed position and said housing accommodates regulatory compliance components and non-regulatory compliance components;
   a verification cap, said regulatory compliance components arranged under said verification cap and are only accessible by removing said verification cap, said verification cap secured with a verification mark in such a manner that removing said verification cap would destroy said verification mark; and
   at least one locking element, said at least one locking element fastened to said verification cap, said regulatory compliance components are only accessible after the removal of said at least one locking element,
   wherein said at least one locking element can be removed while the housing is in said closed position.

2. The instrument according to claim 1, wherein said locking element is secured with a verification mark and said verification mark is visible when said housing is in the closed position.

3. The instrument according to claim 1, wherein a single locking element is capable of being removed while the housing is in the closed position.

4. The instrument of claim 1 further comprising a threaded aperture in said verification cap, said threaded aperture adapted to receive said at least one locking element.

5. The instrument of claim 1, wherein said at least one locking element is a threaded screw.

6. The instrument of claim 1 further comprising a carrier element, said carrier element has the regulatory compliance components arranged thereon is located underneath said verification cap.

7. The instrument of claim 1 further comprising a sensor, said sensor positioned to detect a change in position of the at least one locking element.

8. The instrument of claim 7, wherein the sensor is a light sensor.

9. The instrument of claim 7, wherein the sensor is a pressure sensor.

10. The instrument of claim 7, wherein said sensor may transmit a signal representing a change in position of the at least one locking element to an output unit.

11. The instrument of claim 10 further comprising a display unit, wherein said signal is displayed on sad display unit.

12. The instrument of claim 1, wherein said instrument is a weighing scale.

13. The instrument of claim 1, wherein said housing has a first portion and a second portion; and
 a display portion is connected to said first portion of said housing.

14. The instrument of claim 13, wherein said regulatory compliance components are connected to said second portion of said housing such that the housing can be opened without destroying said verification mark.

15. A weighing scale, comprising:
 a housing having an open and closed position;
 regulatory compliance components;
 non-regulatory compliance components, said regulatory and non-regulatory compliance components located in said housing;
 a verification cap positioned over said regulatory compliance components such that said regulatory compliance components are only accessible by removing said verification cap;
 at least one locking element, said at least one locking element secures said verification cap to said second portion of said housing; and
 at least one sensor positioned so as to detect the position of said at least one locking element,
 wherein said at least one locking element is arranged so as to be removable with the housing is in said closed position.

16. The weighing instrument of claim 15, further comprising a display unit in connection to said second portion of said housing, said display unit displaying a signal generated by said at least one sensor indicating the position of the at least one locking element.

17. The weighing instrument of claim 15, wherein said at least one locking element is a threaded screw.

18. The weighing instrument of claim 15 further comprising a carrier element having carrying said regulatory compliance components, said carrier element located under said verification cap.

19. A method of changing the status of an instrument from verified to non-verified, comprising:
 providing a housing having an open and closed position, said housing accommodates regulatory compliance components and non-regulatory compliance components;
 arranging said regulatory compliance components under a verification cap, said regulatory compliance component accessible only by removal of said verification cap;
 securing said verification cap with a verification mark in such a manner that removing said verification cap destroys said verification mark;
 fastening at least one locking element to said verification cap, said regulatory compliance components only accessible after the removal of said at least one locking element, said at least one locking element can be removed while said housing is in said closed position; and
 changing the status of said weighing scale is changed from verified to non-verified by at least partial removal of said at least one locking element.

20. The method of claim 19, further comprising providing sensors to detect a change in the position of the at least one locking element.

* * * * *

UNITED STATES PATENT AND TRADEMARK OFFICE
CERTIFICATE OF CORRECTION

| | | |
|---|---|---|
| PATENT NO. | : 8,664,546 B2 | Page 1 of 1 |
| APPLICATION NO. | : 13/204521 | |
| DATED | : March 4, 2014 | |
| INVENTOR(S) | : Thomas Schön | |

It is certified that error appears in the above-identified patent and that said Letters Patent is hereby corrected as shown below:

In the Claims

Claim 11, in column 7, line 16, please delete "on sad display" and insert -- on said display --.

Signed and Sealed this
Second Day of September, 2014

Michelle K. Lee
*Deputy Director of the United States Patent and Trademark Office*